United States Patent
Ishihara et al.

(10) Patent No.: US 7,105,608 B2
(45) Date of Patent: Sep. 12, 2006

(54) COPOLYMER OF PROPYLENE WITH A CONJUGATED DIENE AND A PROCESS OF PREPARING THE SAME

(75) Inventors: Takeshi Ishihara, Ibaraki (JP); Ban The Hoang, Ibaraki (JP); Hideaki Hagihara, Ibaraki (JP); Kenji Tsuchihara, Ibaraki (JP); Takeshi Shiono, Hiroshima (JP)

(73) Assignees: Tonen Chemical Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/943,128

(22) Filed: Sep. 17, 2004

(65) Prior Publication Data

US 2005/0154139 A1    Jul. 14, 2005

(30) Foreign Application Priority Data

Jan. 14, 2004  (JP)  ............... 2004-006869

(51) Int. Cl.
  *C08F 297/04*  (2006.01)
  *C08L 53/00*   (2006.01)
(52) U.S. Cl. .............. 525/240; 525/245; 525/314; 526/158; 526/335; 526/351
(58) Field of Classification Search ........ 525/240, 525/245, 314; 526/158, 335, 351
See application file for complete search history.

(56) References Cited

U.S. PATENT DOCUMENTS 5,502,114 A    3/1996  Murakami et al.
6,177,377 B1 *  1/2001  Chien ................... 502/113
6,515,037 B1 *  2/2003  Tsutsui et al. ........... 521/142
6,632,885 B1 * 10/2003  Morizono et al. ........ 525/191

FOREIGN PATENT DOCUMENTS

| JP | A-06-122710   | 5/1994  |
| JP | A-06-293818   | 10/1994 |
| JP | A-09-316118   | 12/1997 |
| JP | A-10-168123   | 6/1998  |
| JP | A-11-080269   | 3/1999  |
| JP | A-2000-128933 | 5/2000  |
| JP | A-2002-201225 | 7/2002  |

OTHER PUBLICATIONS

Thale Sofie Wester et al.; "Kinetic studies of the injection of comonomers during polymerization of ethene and propene With MgCl$_2$-supported Ziegler-Natta catalysts"; *Macromol. Chem. Phys.*; vol. 198; 1997; pp. 1623-1648.

Dong-Ho Lee et al.; "Copolymerizations of Olefins and Dienes With Homogeneous and Heterogeneous Catalysts"; *Eur Polm. J.*; vol. 33, No. 4, 1997; pp. 447-451.

* cited by examiner

*Primary Examiner*—James J. Seidleck
*Assistant Examiner*—Olga Asinovsky
(74) *Attorney, Agent, or Firm*—Oliff & Berridge, PLC

(57) ABSTRACT

The present invention provides a new copolymer of propylene and a conjugated diene having a carbon-carbon double bond in a side chain, wherein a molar ratio of a total of 1,2-adducts and 3,4-adducts to 1,4-adducts, derived from the conjugated diene, is 100:0. The copolymer is prepared in a process, characterized in that propylene and the conjugated diene are copolymerized in the presence of hydrogen, an organometallic compound comprising a transition metal selected from the group 4 of the periodic table, and at least one Lewis acid.

9 Claims, 1 Drawing Sheet

COPOLYMER OF PROPYLENE WITH A CONJUGATED DIENE AND A PROCESS OF PREPARING THE SAME

CROSS REFERENCE

This application claims the benefit of Japanese Patent application No. 2004-006869 filed on Jan. 14, 2004, the content of which is hereby incorporated by reference.

FIELD OF THE INVENTION

The present invention relates to a copolymer of propylene with a conjugated diene and a process for preparing the same, more particularly, to such a copolymer having a carbon-carbon double bond in a side chain and a process for preparing the same.

PRIOR ART

Polyolefin, especially, polypropylene, is used in various fields since it is inexpensive and has excellent chemical resistance and well-balanced mechanical strength. However polypropylene has poor affinity with polar materials such as polyester resin since it is nonpolar. This brings about drawbacks such as poor coating properties and adhesive properties. Consequently, means to decorate surface of polypropylene products were limited.

As a means to solve the above-described problems, processes to provide polypropylene with a polar group were discussed. Typical methods to provide polypropylene with a polar group include (1) a process where polypropylene is treated chemically, (2) a process where a polar group is introduced at a terminal of polypropylene byway of living polymerization, and (3) a process where a polar group is introduced into polypropylene via copolymerization.

As a process where polypropylene is treated chemically, chlorination and reaction with maleic acid and/or maleic anhydride are often used, as disclosed in Japanese Patent Application Laid-open Nos. 10-168123 and 6-293818. Through these, chlorine atoms or carboxyl groups are introduced into polypropylene to make it polar. However, this process is performed in a solution or molten state and, therefore, usually accompanied with deterioration of polypropylene. It is also impossible to control sites in which the polar group is introduced, so that the resulting resin is not homogeneous.

A polar group can be introduced at a terminal of the polymer having a uniform molecular weight by using a process to introduce a polar group by way of living polymerization, as disclosed in Japanese Patent Application Laid-open No. 6-122710. However, this process generally requires a low polymerization temperature such as −30 degrees C. or lower. The productivity is low since one polymer chain is synthesized by one molar catalyst, which results in a high production cost. In addition, the polypropylene thus obtained has the polar group only at one terminal of the polymer.

As a process to introduce a polar group into polypropylene via copolymerization, mention is made of a process where copolymerization of propylene and a polar monomer is performed, as disclosed in Japanese Patent Application Laid-open No. 2002-201225. In the copolymerization process, a polar group is generally protected with a protecting group before the polymerization. However, this process has drawbacks that a reaction is needed to protect a polar group with a protecting group and that the productivity is not high because of interaction between the protected polar groups.

Japanese Patent Application Laid-open No. 9-316118 describes a process to copolymerize an olefin with a conjugated diene in the presence of a compound with a specific structure comprising a transition metal of the group 4 of the periodic table and at least one promoter selected from organometallic compounds, organoaluminumoxy compounds, ionic compounds and Lewis acid compounds. The Examples give results of the copolymerization of ethylene with butadiene. The resulting copolymer comprises 1,2-adducts and 1,4-adducts of butadiene, where 1,4-adducts accounts for 70% of the total of the both adducts.

Japanese Patent Application Laid-open No. 11-80269 describes a copolymer of an alpha-olefin with a conjugated diene and a process for the preparation thereof, where use is made of a transition metal complex with a specific structure and a catalyst system composed of one or more compounds selected from ionic compounds, organoaluminum compounds, and almoxanes. It is described that in the resulting copolymer, a molar ratio of the double bond in the side chain of the 1,2-adduct, including the 3,4-adduct, of the conjugated diene, to the double bond in the main chain of the 1,4-adduct of the conjugated diene ranges from 5:95 to 99:1. The publication describes that a wide range of transition metal complexes may be used, but use is made of only (dimethyl (t-butylamide) (tetramethyl-$\eta^5$-cyclopentadineyl) silane)titanium dichloride in Examples A1 to A4, and C1 and C2, and isopropylidene bisindenyl zirconium dichloride in Examples B1 and B2. In the Examples, only the copolymers are obtained where the above molar ratio is from 20/80 to 40/60 (Examples A1 to A4), 67/33 and 65/35 (Examples B1 and B2), and 22/78 and 21/79 (Examples C1 and C2). Further, the copolymers have five-membered rings which result from intramolecular cyclization.

Japanese Patent Application Laid-open No. 2000-128933 describes that copolymers prepared by copolymerizing an alpha-olefin with a conjugated polyene in the presence of a catalyst composed of a specific transition metal complex, an organic aluminum and/or boron compound and a process for the preparation thereof. The above publication does not refer to 1,2- or 1,4-adducts.

It is conceivable to use a conjugated diene with a short distance between two double bonds in order to synthesize a copolymer having a double bond in a side chain without forming a ring. However, such a conjugated diene usually acts as a catalytic poison against polypropylene synthesizing catalysts, as described in *Macromol. Chem. Phys.*, T. S. Wester and M. Ystenes, Vol. 198, pp 1623-1648, 1997, and *Eur. Polym. J*, Lee, K. Yoon, J. Park, and B. Lee, Vol. 33, No. 4, pp 447-451, 1997. Accordingly, in the above process, it is difficult to produce a copolymer of propylene with a conjugated diene in high yield, so that the process cannot be used commercially. In the process, it was impossible to produce a copolymer of propylene with a conjugated diene having more double bonds in side chains than in main chain.

SUMMARY OF THE INVENTION

The present invention provides a process for preparing a copolymer of propylene with a conjugated diene having a carbon-carbon double bond in a side chain, characterized in that propylene and a conjugated diene are copolymerized in the presence of hydrogen, a cross-linked metallocene compound represented by the following general formula (1), and at least one Lewis acid,

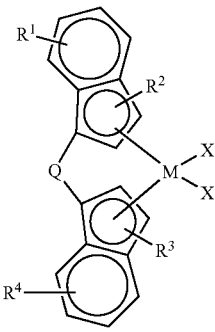

general formula (1)

wherein $R^1$ and $R^4$ are each independently selected from the group consisting of a hydrogen atom and aryl groups having 6 to 20 carbon atoms, $R^2$ and $R^3$ are each independently selected from the group consisting of hydrogen atom and alkyl groups having 1 to 5 carbon atoms, provided that not all of $R^1$, $R^2$, $R^3$, and $R^4$ are a hydrogen atom, M represents a transition metal of the group 4 of the periodic table, the two X's are each independently selected from the group consisting of a halogen atom and alkyl groups having 1 to 3 carbon atoms, and Q represents a cross-linking group.

The present invention also provides a copolymer of propylene with a conjugated diene having a carbon-carbon double bond in a side chain, the copolymer having a number average molecular weight of from 1,000 to 1,000,000, wherein a molar ratio of a total of 1,2-adducts and 3,4-adducts to 1,4-adducts, derived from the conjugated diene in the copolymer, is 100:0.

DETAILED DESCRIPTION OF THE INVENTION

Figure 1:
FIG. 1 is a $^1$H-NMR chart of copolymers obtained in Example 1 and Comparative Example 2. "1,4-BD" there refers to a double bond of 1,4-adduct of 1,3-butadiene, which is present in a main chain of a propylene-butadiene copolymer, and "1,2-BD" refers to a double bond of 1,2 adduct of 1,3-butadiene, which is present in a side chain of a propylene-butadiene copolymer.
Figure 1:
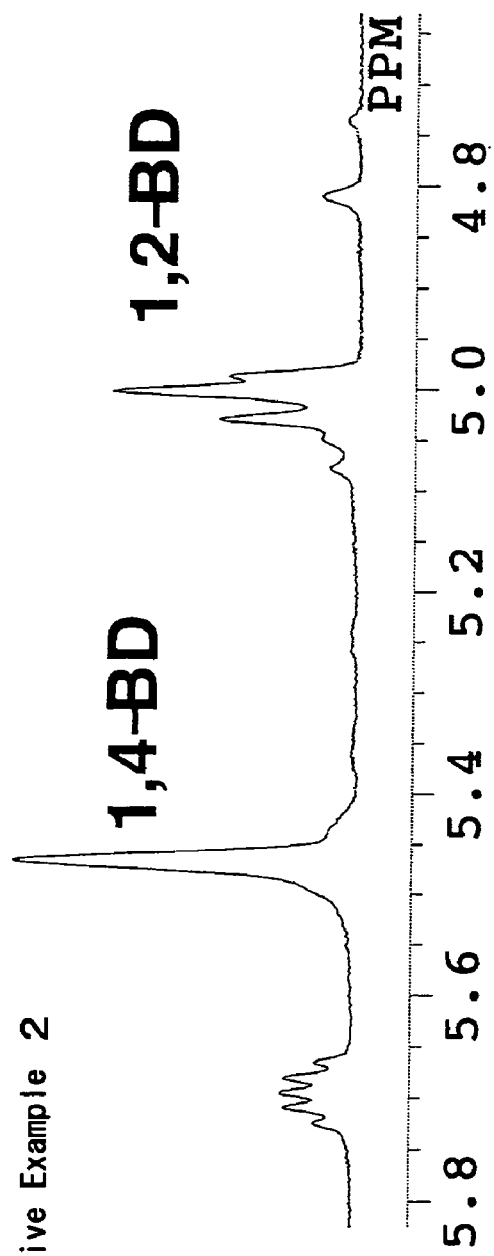

Polymerization activity can be enhanced by introducing hydrogen into a copolymerization process, and a carbon-carbon double bond can be introduced into a side chain in a highly selective manner by causing chain transfer on account of hydrogen. Preferably, the process is performed in the presence of pressurized hydrogen. For a hydrogen partial pressure in the copolymerization, the upper limit is preferably 5 MPa, more preferably 1 MPa, while the lower limit is 0.01 MPa, more preferably 0.05 MPa. Above the upper limit, costs are high due to required pressure tightness of a reactor but any remarkable effect is not observed. Below the lower limit, no carbon-carbon double bond can be introduced into a side chain of a propylene-conjugated diene copolymer.

In the general formula (1) for the cross-linked metallocene used in the present invention, $R^1$ and $R^4$ are each independently selected from the group consisting of a hydrogen atom and aryl groups having 6 to 20 carbon atoms, more preferably from phenyl, benzyl, naphtyl, or anthryl group. $R^2$ and $R^3$ are each independently selected from the group consisting of a hydrogen atom and alkyl groups having 1 to 5 carbon atoms. Here not all of $R^1$, $R^2$, $R^3$, and $R^4$ are a hydrogen atom. In other words, (i) when both $R^1$ and $R^4$ in the above formula represent an aryl group having 6 to 20 carbon atoms, both of $R^2$ and $R^3$ represent an alkyl group having 1 to 5 carbon atoms, one of $R^2$ and $R^3$ represents an alkyl group having 1 to 5 carbon atoms and the other represents a hydrogen atom, or both of $R^2$ and $R^3$ represent a hydrogen atom, (ii) when one of $R^1$ and $R^4$ represents an aryl group having 6 to 20 carbon atoms and the other represents a hydrogen atom, both $R^2$ and $R^3$ represent an alkyl group having 1 to 5 carbon atoms, one of $R^2$ and $R^3$ represents an alkyl group having 1 to 5 carbon atoms and the other represents a hydrogen atom, or both of $R^2$ and $R^3$ represent a hydrogen atom, or (iii) when both $R^1$ and $R^4$ represent a hydrogen atom, both $R^2$ and $R^3$ represent an alkyl group having 1 to 5 carbon atoms or one of $R^2$ and $R^3$ represents an alkyl group having 1 to 5 carbon atoms and the other represents a hydrogen atom. This makes it possible to have a molar ratio of a total of 1,2-adducts and 3,4-adducts to 1,4-adducts of 100:0. Among the options described above, $R^2$ and $R^3$ more preferably represent an alkyl group having 1 to 5 carbon atoms. M represents a transition metal of the group 4 of the periodic table, preferably Zr, Ti, or Hf, particularly preferably Zr. The two X's are each independently selected from the group consisting of a halogen atom and alkyl groups having 1 to 3 carbon atoms. The halogen atom is preferably flourine, chlorine, bromine, or iodine. The alkyl group is preferably a methyl, ethyl, or propyl group. Among these, chlorine is particularly preferred for X. Q represents a cross-linking group. Examples of the cross-linking groups include (cyclo)alkylene groups such as methylene, ethylene, isopropylene, and cyclohexylene, etc. and silylene groups such as silylene, dimethylsilylene, phenyl methyl silylene, and diphenyl silylene. Among these, methylene, ethylene, and dimethylsilylene groups are preferred.

As the cross-linked metallocene compounds represented by the general formula (1), use is made of methylenebis(2-methylindenyl)zirconium dichloride, methylenebis(4-phenylindenyl)zirconium dichloride, methylenebis(benzoindenyl)zirconium dichloride, methylenebis(2-methylbenzoindenyl)zirconium dichloride, methylenebis(2-methyl-4-phenyl-indenyl)zirconium dichloride, methylenebis(2-methylindenyl)titanium dichloride, methylenebis(4-phenyl-indenyl)titanium dichloride, methylenebis(benzoindenyl)titanium dichloride, methylenebis(2-methyl-benzoindenyl)titanium dichloride, methylenebis(2-methyl-4-phenyl-indenyl)titanium dichloride, methylenebis(2-methylindenyl)hafnium dichloride, methylenebis(4-phenyl-indenyl)hafnium dichloride, methylenebis(benzoindenyl) hafnium dichloride, methylenebis(2-methyl-benzoindenyl) hafnium dichloride, methylenebis(2-methyl-4-phenyl-indenyl) hafnium dichloride, methylenebis(2-methylindenyl)zirconium dimethyl, methylenebis(4-phenyl-indenyl)zirconium dimethyl, methylenebis(benzoindenyl) zirconium dimethyl, methylenebis(2-methyl-benzoindenyl) zirconium dimethyl, methylenebis(2-methyl-4-phenyl-indenyl)zirconium dimethyl, methylenebis(2-methylindenyl)titanium dimethyl, methylenebis(4-phenyl-indenyl) titanium dimethyl, methylenebis(benzoindenyl) titanium dimethyl, methylenebis(2-methyl-benzoindenyl) titanium dimethyl, methylenebis(2-methyl-4-phenyl-indenyl)titanium dimethyl, methylenebis(2-methylindenyl) hafnium dimethyl, methylenebis(4-phenyl-indenyl)hafnium dimethyl, methylenebis(benzoindenyl)hafnium dimethyl, methylenebis(2-methyl-benzoindenyl) hafnium dimethyl, methylenebis(2-methyl-4-phenyl-indenyl)hafnium dimethyl, ethylenebis(2-methylindenyl)zirconium dichloride, ethylenebis(4-phenyl-indenyl)zirconium dichloride, ethylenebis(benzoindenyl)zirconium dichloride, ethylenebis(2-methyl-benzoindenyl)zirconium dichloride, ethylenebis(2-methyl-4-phenyl-indenyl)zirconium dichloride, ethylenebis(2-methylindenyl) titanium dichloride, ethylenebis(4-phenyl-indenyl)titanium dichloride, ethylenebis(benzoindenyl)titanium dichloride, ethylenebis(2-methyl-benzoindenyl)titanium dichloride, ethylenebis(2-methyl-4-phenyl-indenyl)titanium dichloride, ethylenebis(2-methylindenyl)hafnium dichloride, ethylenebis(4-phenyl-indenyl)hafnium dichloride, ethylenebis(benzoindenyl) hafnium dichloride, ethylenebis(2-methyl-benzoindenyl) hafnium dichloride, ethylenebis(2-methyl-4-phenyl-indenyl)hafnium dichloride, ethylenebis(2-methylindenyl) zirconium dimethyl, ethylenebis(4-phenyl-indenyl) zirconium dimethyl, ethylenebis(benzoindenyl)zirconium dimethyl, ethylenebis(2-methyl-benzoindenyl)zirconium dimethyl, ethylenebis(2-methyl-4-phenyl-indenyl)zirconium dimethyl, ethylenebis(2-methylindenyl)titanium dimethyl, ethylenebis(4-phenyl-indenyl)titanium dimethyl, ethylenebis(benzoindenyl)titanium dimethyl, ethylenebis(2☐methyl-benzoindenyl)titanium dimethyl, ethylenebis(2-methyl-4-phenyl-indenyl)titanium dimethyl, ethylenebis(2-methylindenyl)hafnium dimethyl, ethylenebis(4-phenyl-indenyl)hafnium dimethyl, ethylenebis(benzoindenyl) hafnium dimethyl, ethylenebis(2-methyl-benzoindenyl) hafnium dimethyl, ethylenebis(2-methyl-4-phenyl-indenyl) hafnium dimethyl, dimethylsilylenebis(2-methylindenyl) zirconium dichloride, dimethylsilylenebis(4-phenyl-indenyl)zirconium dichloride, dimethylsilylenebis (benzoindenyl)zirconium dichloride, dimethylsilylenebis(2-methyl-benzoindenyl)zirconium dichloride, dimethylsilylenebis(2-methyl-4-phenyl-indenyl)zirconium dichloride, dimethylsilylenebis(2-methylindenyl)titanium dichloride, dimethylsilylenebis(4-phenyl-indenyl)titanium dichloride, dimethylsilylenebis(benzoindenyl)titanium dichloride, dimethylsilylenebis(2-methyl-benzoindenyl)titanium dichloride, dimethylsilylenebis(2-methyl-4-phenyl-indenyl)titanium dichloride, dimethylsilylenebis(2-methylindenyl)hafnium dichloride, dimethylsilylenebis(4-phenyl-indenyl)hafnium dichloride, dimethylsilylenebis (benzoindenyl)hafnium dichloride, dimethylsilylenebis(2-methyl-benzoindenyl)hafnium dichloride, dimethylsilylenebis(2-methyl-4-phenyl-indenyl)hafnium dichloride, dimethylsilylenebis(2-methylindenyl)zirconium dimethyl, dimethylsilylenebis(4-phenyl-indenyl)zirconium dimethyl, dimethylsilylenebis(benzoindenyl)zirconium dimethyl, dimethylsilylenebis(2-methyl-benzoindenyl)zirconium dimethyl, dimethylsilylenebis(2-methyl-4-phenyl-indenyl)zirconium dimethyl, dimethylsilylenebis(2-methylindenyl)titanium dimethyl, dimethylsilylenebis(4-phenyl-indenyl)titanium dimethyl, dimethylsilylenebis(benzoindenyl)titanium dimethyl, dimethylsilylenebis(2-methyl-benzoindenyl)titanium dimethyl, dimethylsilylenebis(2-methyl-4-phenyl-indenyl)titanium dimethyl, dimethylsilylenebis(2-methylindenyl)hafnium dimethyl, dimethylsilylenebis(4-phenyl-indenyl)hafnium dimethyl, dimethylsilylenebis(benzoindenyl)hafnium dimethyl, dimethylsilylenebis(2-methyl-benzoindenyl)hafnium dimethyl, or dimethylsilylenebis(2-methyl-4-phenyl-indenyl) hafnium dimethyl.

More preferably, the cross-linked metallocene compound represented by the general formula (1) is dimethylsilylenebis (2-methyl-benzoindenyl)zirconium dichloride, dimethylsilylenebis(2-methyl-4-phenyl-indenyl)zirconium dichloride, dimethylsilylenebis(2-methylindenyl)zirconium dichloride, dimethylsilylenebis(2-methyl-benzoindenyl)titanium dichloride, dimethylsilylenebis(2-methyl-4-phenyl-indenyl) titanium dichloride, dimethylsilylenebis(2-methylindenyl) titanium dichloride, dimethylsilylenebis(2-methyl-benzoindenyl)hafnium dichloride, dimethylsilylenebis(2-methyl-4-phenyl-indenyl)hafnium dichloride or dimethylsilylenebis (2-methylindenyl)hafnium dichloride.

Examples of the Lewis acid used as promoter with the above cross-linked metallocene compound include aluminum compounds, boron compounds, zinc compounds such as alkyl zinc compounds, magnesium compounds such as alkyl magnesium compounds, lithium compounds such as alkyl lithium compounds, and silicon-containing compounds. Among these, particularly preferred are aluminum compounds and boron compounds, especially, aluminum compounds, particularly almoxane such as methylalmoxane according to the following general formulae (2) or (3),

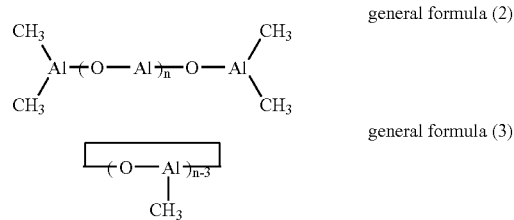

wherein n is an integer of from 0 to 40, preferably from 2 to 30.

The compounds according to the general formulae (2) and (3) can be obtained by a reaction of trimethyl aluminum with water. The methyl almoxane can be used in combination with other almoxanes obtained from other trialkyl aluminum and water, such as ethyl alomoxane, propyl almoxane, butyl almoxane, isobutyl almoxane, methyl ethyl almoxane, methyl butyl almoxane, or methyl isobutyl almoxane.

The methyl almoxane can be prepared according to any well-known process. Mention may be made of, for instance, (a) a process where trimethyl aluminum is reacted directly with water using an appropriate organic solvent such as toluene, benzene, or ether, (b) a process where trimethyl aluminum is reacted with a salt hydrate having crystalline water, such as hydrate of copper sulfate or that of aluminum sulfate, (c) a process where trimethyl aluminum is reacted with water absorbed in silica gel, (d) a process where trimethyl aluminum and triisobutyl aluminum are blended and reacted directly with water using an appropriate organic solvent such as toluene, benzene, or ether, (e) a process where trimethyl aluminum and triisobutyl aluminum are blended and reacted, under heating, directly with a salt hydrate having crystalline water, such as hydrate of copper sulfate or that of aluminum sulfate, (f) a process where silica gel is let to absorb water, treated with triisobutyl aluminum and then treated with trimethyl aluminum, (g) a process where trimethyl almoxane and isobutyl almoxane are each synthesized according to a well-known process, blended with each other in given amounts, and then subjected to reaction under heating, (h) a process where a salt having crystalline water such as copper sulfate penta hydrate is added to an aromatic hydrocarbon solvent such as benzene or toluene and reacted with trimethyl aluminum at a temperature of −40 to 40 degrees C., wherein a molar amount of water to be used ranges generally from 0.5 to 1.5 per mol of trimethyl aluminum.

As the boron compound, mention is made of $Ph_3CB$ $(C_6F_5)_4$, $PhNMeHB(C_6F_5)_4$, and $B(C_6F_5)_3$. As the alkyl zinc compound, mention is made of diethyl zinc. As the alkyl magnesium compound, mention is made of tertiary-butyl magnesium chloride. As the alkyl lithium compound, mention is made of n-butyl lithium. As the silicon-containing compound, mention is made of silica gel.

For a temperature of the copolymerization described above, the upper limit is 100 degrees C., more preferably 80 degrees C., while the lower limit is preferably −100 degrees C., more preferably 0 degree C. Catalyst is deactivated above the upper limit, whereas polymerization rate is too low below the lower limit. For a copolymerization time, the upper limit is 500 hours, more preferably 50 hours, whereas the lower limit is preferably 0.1 hour, more preferably 0.5 hour. The copolymerization does not proceed enough below the lower limit.

The copolymerization can be performed in a gas phase as well as in a liquid phase. The monomer amount of propylene and the conjugated diene vary depending on a polymerization temperature, polymerization pressure, and polymerization process, etc. and may be those known to the person skilled in the art. The molecular weight of the resulting copolymer can be controlled by changing catalyst types, polymerization temperature, and ratio of monomers. Dependency of molecular weight on a catalyst type observed in the copolymerization is similar to that observed in polymerization of propylene alone. A copolymer with a higher molecular weight can be obtained using a catalyst suitable for the preparation of a polymer with a higher molecular weight, such as dimethylsilylenebis(2-methyl-4-phenyl-indenyl)zirconium dichloride. Even with the same catalyst, a higher polymerization temperature gives a copolymer with a lower molecular weight, whereas a lower polymerization temperature gives a copolymer with a higher molecular weight. It is also possible to obtain a copolymer with a higher molecular weight by raising molar concentrations of propylene and the conjugated diene in the reactor while keeping the molar ratio of propylene/conjugated diene constant. When the process is performed in a liquid phase, this can be performed in an inert inactive hydrocarbon such as normal butane, isobutane, normal pentane, isopentane, hexane, heptane, octane, cyclohexane, cycloheptane, benzene, toluene, or xylene, or in a liquid propylene monomer. The copolymerization may preferably be performed in so a controllable way that a molar ratio of the monomers in a reactor is kept substantially unchanged, in, for instance, a continuous process, a semi-batch process, or a batch process. The copolymerization can be carried out in one stage or two or more stages.

When the copolymerization in the process of the present invention is performed in solution polymerization, the concentration of the cross-linked metallocene compound is preferably from $1\times10^{-5}\sim1\times10^{-2}$ mole/L. The amount of the Lewis acid is preferably 50 to 50,000 mols, more preferably, 100 to 10,000 mols per mol of the cross-linked metallocene compound.

The conjugated diene used in the copolymerization with propylene preferably has 4 to 20 carbon atoms, more preferably 4 to 12 carbon atoms. For instance, mention may be made of 1,3-butadiene, isoprene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-butadiene, 2-methyl-1,3-hexadiene, 2-methyl-1,3-octadiene, 2-methyl-1,3-decadiene, 2,3-dimethyl-1,3-pentadiene, 2,3-dimethyl-1,3-octadiene, and 2,3-dimethyl-1,3-decadiene. Among these, 1,3-butadiene or isoprene, particularly 1,3-butadiene is preferably used.

According to the process of the present invention, a copolymer of propylene with a conjugated diene which has a carbon-carbon double bond selectively in a side chain can be obtained. In the copolymer, a molar ratio of a total of 1,2-adducts and 3,4-adducts to 1,4-adducts is 100:0. The upper limit of number average molecular weight of the copolymer is preferably 1,000,000, more preferably 500,000, whereas the lower limit is preferably 1,000, more preferably 2,000. Below the lower limit, mechanical strength is poor, while above the upper limit, the adhesive property and miscibility are poor. As a functionality comprising the carbon-carbon double bond, a vinyl group is preferred. The copolymer does not contain five-membered rings.

According to the present invention, the resulting copolymer has substantially all of the carbon-carbon double bonds in the side chains, not in the main chain and, therefore, it is possible to provide the side chains of the copolymer with a large amount of functional groups. Hence it is possible to provide the coating compositions comprising the copolymer which have higher dyeing properties, adhesion properties, and miscibility with polar polymers. It is easy to manufacture various graft copolymers from the copolymer. Accordingly the copolymer has many industrial applications, such as additives for coating composition, and exterior and interior materials for cars.

In the following Examples, the present invention will be further explained in detail, but the present invention is not limited thereto.

The structural analysis of the resulting propylene-butadiene copolymer was performed by $^1$H-NMR.

$^1$H-NMR: use was made of a Fourier Transform NMR spectrometer, JEOL JNM-LA600, in the measurement conditions of 600 MHz, 45 degrees of a pulse angle, 8 seconds of pulse intervals, 120 degrees C., and 256 accumulation numbers. The sample was a solution of 10 mg of a copolymer in 0.5 ml of deuterium tetrachloroethane.

The contents in mol % of 1,2-BD, the double bond present in the side chain of the copolymer, and 1,4-BD, the double bond present in the main chain of the copolymer, were obtained from the monomer ratio, which was calculated from peaks in 5.4 to 5.6 ppm attributable to 1,2-BD, peaks in 4.9 to 5.1 ppm attributable to 1,4-BD and peaks in 1 to 2 ppm attributable to propylene in the NMR spectra.

A number average molecular weight of the resulting propylene-butadiene copolymer was determined with GPC.

GPC: use was made of PL-GPC210, from Polymer Laboratory. Ortho-dichlorobenzene was used as a solvent at 140 degrees C. The sample had a concentration of 0.05 to 0.1 wt. %. Polystyrene standard samples were used for analysis.

EXAMPLE 1

To an $N_2$ purged autoclave of 100 ml capacity, added was a solution in a small amount of toluene, of 4 mmols of modified methyl almoxane (MMAO, from Tosoh Finechem) prepared from trimethyl aluminum and triisobutyl aluminum and 2 micro mols of dimethylsilylenebis(2-methyl-benzoindenyl)zirconium dichloride (from Bolder), and toluene was added so that the final total volume of the solvent be 40 ml. Then, 0.2 g of 1,3-butadiene and 3 g of propylene were added. Subsequently the autoclave was charged with hydrogen until the pressure became 0.1 MPa. These were allowed to react for an hour in a bath of a temperature of 0 degree C.

Then, the reaction solution was poured into methanol acidified by hydrochloric acid to collect a copolymer. The collected copolymer was dried under vacuum at a temperature of 60 degrees C. for 4 hours to obtain 0.61 g of the copolymer. The number average molecular weight of the copolymer was 24, 900, as reduced to polystyrene. After further purification, the amount of butadiene residue in the copolymer was quantified using $^1$H-NMR. The amount of 1,2-BD was found to be 0.46 mol %. Meanwhile, no 1,4-BD was detected. Therefore, the molar ratio of the 1,2-adduct to the 1,4-adduct was 100: 0. No five-membered ring which results from intramolecular cyclization was present.

EXAMPLE 2

The procedures of Example 1 were repeated except that 1 micro mol, instead of 2 micro mols, of dimethylsilylenebis(2-methyl-benzoindenyl)zirconium dichloride, 10 mmols, instead of 4 mmols, of modified methyl almoxane, and 1.5 g, instead of 0.2 g, of 1,3-butadiene were used. 0.20 g of the copolymer was obtained. The number average molecular weight of the copolymer was 7,100, as reduced to polystyrene. The amount of the 1,2-BD was 3.13 mol %. Meanwhile, no 1,4-BD was detected. The molar ratio of the 1,2-adduct to the 1,4-adduct was 100:0. No five-membered ring which results from intramolecular cyclization was present.

EXAMPLE 3

The procedures of Example 1 were repeated except that 1 micro mol of dimethylsilylenebis(2-methyl-4-phenylindenyl)zirconium dichloride was used instead of 2 micro mols of dimethylsilylenebis(2-methyl-benzoindenyl)zirconium dichloride, 10 mmols, instead of 4 mmols, of modified methyl almoxane, and 0.5 g, instead of 0.2 g, of 1,3-butadiene were used. 2.29 g of the copolymer was obtained. The number average molecular weight was 34, 600, as reduced to polystyrene. The amount of the 1,2-BD was 2.81 mol %. Meanwhile, no 1,4-BD was detected. The molar ratio of the 1,2-adduct to the 1,4-adduct was 100:0. No five-membered ring which results from intramolecular cyclization was present.

EXAMPLE 4

The procedures of Example 1 were repeated except that 1 micro mol, instead of 2 micro mols, of dimethylsilylenebis(2-methyl-benzoindenyl)zirconium dichloride, 1 micro mol of $Ph_3CB(C_6F_5)_4$ and 5 mmols of triisobutyl aluminum (TiBAl), instead of 4 mmols of modified methyl almoxane, and 0.5 g, instead of 0.2 g, of 1,3-butadiene were used. 0.62 g of the copolymer was obtained. The number average molecular weight of the copolymer was 20, 300, as reduced to polystyrene. The amount of the 1,2-BD was 1.0 mol %. Meanwhile, no 1,4-BD was detected. The molar ratio of the 1,2-adduct to the 1,4-adduct was 100: 0. No five-membered ring which results from intramolecular cyclization was present.

EXAMPLE 5

The procedures of Example 1 were repeated except that 1 micro mol of dimethylsilylenebis(2-methyl-indenyl)zirconium dichloride was used instead of 2 micro mols of dimethylsilylenebis(2-methyl-benzoindenyl)zirconium dichloride, 10 mmols, instead of 4 mmols, of modified methyl almoxane and 1.0 g, instead of 0.2 g, of 1,3-butadiene were used. 0.31 g of the copolymer was obtained. The number average molecular weight was 58,700, as reduced to polystyrene. The amount of the 1,2-BD was 0.28 mol %. Meanwhile, no 1,4-BD was detected. The molar ratio of the 1,2-adduct to the 1,4-adduct was 100:0. No five-membered ring which results from intramolecular cyclization was present.

EXAMPLE 6

The procedures of Example 4 were repeated except that 15 micro mols, instead of 1 micro mol, of dimethylsilylenebis(2-methyl-benzoindenyl)zirconium dichloride, 15 micro mols, instead of 1 micro mol, of $Ph_3CB(C_6F_5)_4$ and 7.5 mmols, instead of 5 mmols, of triisobutyl aluminum, TiBAl, and 0.6 g, instead of 0.5 g, of 1,3-butadiene were used, the hydrogen pressure was 1.0 MPa instead of 0.1 MPa, the reaction temperature was 40 degrees C. instead of 0 degree C., and the reaction time was 18 hours instead of 1 hour. The number average molecular weight of the copolymer was 2, 800, as reduced to polystyrene. The amount of the 1,2-BD was 0.58 mol %. Meanwhile, no 1,4-BD was detected. The molar ratio of the 1,2-adduct to the 1,4-adduct was 100:0. No five-membered ring which results from intramolecular cyclization was present.

COMPARATIVE EXAMPLE 1

The procedures of Example 1 were repeated except that 1 micro mol of dimethylsilylenebis(1-indenyl)zirconium dichloride was used instead of 2 micro mols of dimethylsilylenebis(2-methyl-benzoindenyl)zirconium dichloride, 10 mmols, instead of 4 mmols, of modified methyl almoxane and 0.5 g, instead of 0.2 g, of 1,3-butadiene were used. 0.22 g of the copolymer was obtained. The number average molecular weight was 12,000, as reduced to polystyrene. The amount of the 1,2-BD was 0.22 mol %. Meanwhile, the amount of 1,4-BD was 0.04 mol %. The molar ratio of the 1,2-adduct to the 1,4-adduct was 84.6:15.4. No five-membered ring which results from intramolecular cyclization was present.

COMPARATIVE EXAMPLE 2

The procedures of Example 1 were repeated except that nitrogen was used instead of hydrogen. 0.02 g of the copolymer was obtained. The number average molecular weight was 25,000, as reduced to polystyrene. The amount of the 1,2-BD was 0.44 mol %. Meanwhile, the amount of 1,4-BD was 0.13 mol %. The molar ratio of the 1,2-adduct to the 1,4-adduct was 77.2:22.8. No five-membered ring which results from intramolecular cyclization was present.

FIG. 1 shows measurement results of $^1$H-NMR on the copolymers obtained in Example 1 and Comparative Example 2. From the above $^1$H-NMR results, it was confirmed that in the copolymer obtained in the Comparative Example 2, both the double bond, 1,4-BD, derived from 1,3-butadiene and present in the main chain of the copolymer, and the double bond, 1,2-BD, derived from 1,3-butadiene and present in the side chain of the copolymer, were present. Meanwhile, in the copolymer obtained in Example 1, no 1,4-BD was observed and only 1,2-BD was observed.

COMPARATIVE EXAMPLE 3

The procedures of Example 1 were repeated except that 1 micro mol of dimethylsilylenebis(2-methyl-4-phenylindenyl)zirconium dichloride was used instead of 2 micro mols of dimethylsilylenebis(2-methyl-benzoindenyl)zirconium dichloride was used and the reaction time was 2 hour instead of 1 hour. 0.04 g of the copolymer was obtained. The number average molecular weight was 53,300, as reduced to polystyrene. The amount of the 1,2-BD was 1.21 mol %. Meanwhile, the amount of 1,4-BD was 0.60 mol %. The molar ratio of the 1,2-adduct to the 1,4-adduct was 66.9: 33.1. No five-membered ring which results from intramolecular cyclization was present.

COMPARATIVE EXAMPLE 4

The procedures of Comparative Example 1 were repeated except that 10 micro mols, instead of 1 micro mol, of dimethylsilylenebis(1-indenyl)zirconium dichloride, and 20 mmols, instead of 10 mmols, of modified methyl almoxane were used and the reaction time was 20 hours instead of 1 hour. 0.18 g of the copolymer was obtained. The number average molecular weight was 21,100, as reduced to polystyrene. The amount of the 1,2-BD was 0.43 mol %. Meanwhile, the amount of 1,4-BD was 1.42 mol %. The molar ratio of the 1,2-adduct to the 1,4-adduct was 23.2: 76.8. No five-membered ring which results from intramolecular cyclization was present.

What is claimed is:

1. A process for preparing a copolymer of propylene with a conjugated diene, having a carbon-carbon double bond in a side chain and a number average molecular weight of from 1,000 to 1,000,000, characterized in that propylene and the conjugated diene are copolymerized in the presence of hydrogen, a cross-linked metallocene compound represented by the following general formula (1), and at least one Lewis acid, and that the copolymer contains no 1,4-adduct derived from the conjugated diene,

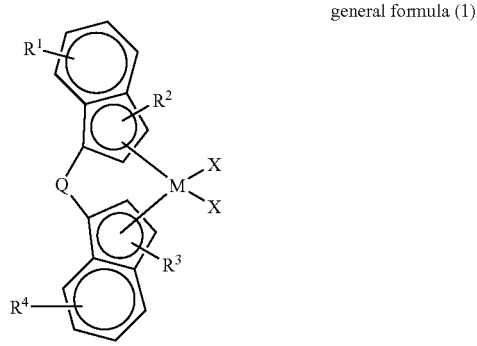

general formula (1)

wherein $R^1$ and $R^4$ are each independently selected from the group consisting of a hydrogen atom and aryl groups having 6 to 20 carbon atoms, $R^2$ and $R^3$ are each independently selected from the group consisting of a hydrogen atom and alkyl groups having 1 to 5 carbon atoms, provided that not all of $R^1$, $R^2$, $R^3$, and $R^4$ are a hydrogen atom, M represents a transition metal of the group 4 of the periodic table, the two X's are each independently selected from the group consisting of a halogen atom and alkyl groups having 1 to 3 carbon atoms, and Q represents a cross-linking group.

2. The process according to claim 1, wherein $R^2$ and $R^3$ in the general formula (1) are each independently selected from alkyl groups having 1 to 5 carbon atoms.

3. The process according to claim 1, wherein M in the general formula (1) is Zr, Ti, or Hf.

4. The process according to claim 1, wherein the metallocene compound represented by the general formula (1) is dimethylsilylenebis(2-methyl-benzoindenyl)zirconium dichloride, dimethylsilylenebis(2-methyl-4-phenyl-indenyl)zirconium dichloride, dimethylsilylenebis(2-methylindenyl)zirconium dichloride, dimethylsilylenebis(2-methyl-benzoindenyl)titanium dichloride, dimethylsilylenebis(2-methyl-4-phenyl-indenyl)titanium dichloride, dimethylsilylenebis(2-methylindenyl)titanium dichloride, dimethylsilylenebis(2-methyl-benzoindenyl)hafnium dichloride, dimethylsilylenebis(2-methyl-4-phenyl-indenyl)hafnium dichloride, or dimethylsilylenebis(2-methylindenyl)hafnium dichloride.

5. The process according to claim 1, wherein hydrogen is present in a partial pressure of from 0.01 to 5 MPa.

6. The process according to claim 1, wherein the carbon-carbon double bond is in a vinyl group.

7. The process according to claim 1, wherein the Lewis acid is an aluminum compound, a boron compound, a zinc compound, a magnesium compound, a lithium compound, or a silicon-containing compound.

8. The process according to claim 1, wherein the Lewis acid is an aluminum compound or a boron compound.

9. The process according to claim 1, wherein the conjugated diene is 1,3-butadiene.

* * * * *